United States Patent
Wu

(10) Patent No.: US 12,532,022 B2
(45) Date of Patent: Jan. 20, 2026

(54) METHOD OF MOTION ADAPTIVE SPATIAL SMOOTHING FOR LOCAL DIMMING AND SYSTEM THEREOF

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 70 days.

(21) Appl. No.: 18/496,947

(22) Filed: Oct. 30, 2023

(65) Prior Publication Data

US 2025/0142110 A1    May 1, 2025

(51) Int. Cl.
*H04N 19/513*    (2014.01)
*G06T 5/70*     (2024.01)

(52) U.S. Cl.
CPC .............. *H04N 19/521* (2014.11); *G06T 5/70* (2024.01)

(58) Field of Classification Search
CPC ................................ G06T 5/70; H04N 19/521
See application file for complete search history.

(56) References Cited

U.S. PATENT DOCUMENTS

| | | |
|---|---|---|
| 2003/0210211 A1 | 11/2003 | Moon |
| 2007/0153117 A1 | 7/2007 | Lin |
| 2009/0079688 A1 | 3/2009 | Chen |
| 2012/0194536 A1 | 8/2012 | Pyo |
| 2019/0130851 A1 | 5/2019 | Cui |
| 2019/0348001 A1 | 11/2019 | Shi |
| 2020/0064688 A1 | 2/2020 | Lin |
| 2020/0135122 A1 | 4/2020 | Song |
| 2021/0005162 A1 | 1/2021 | Qin |
| 2022/0310001 A1 | 9/2022 | Youn |
| 2023/0018404 A1 | 1/2023 | Zen |
| 2024/0013347 A1* | 1/2024 | Yang .................. G06T 7/73 |

FOREIGN PATENT DOCUMENTS

| | | |
|---|---|---|
| CN | 108962150 A | 12/2018 |
| CN | 111091788 A | 5/2020 |
| CN | 114373431 A | 4/2022 |
| JP | 2022-175370 A | 11/2022 |

OTHER PUBLICATIONS

Huang, the specification, including the claims, and drawings in the U.S. Appl. No. 18/645,337, filed Apr. 24, 2024.

* cited by examiner

*Primary Examiner* — On S Mung
(74) *Attorney, Agent, or Firm* — Winston Hsu

(57) ABSTRACT

A method of motion adaptive spatial smoothing includes determining a difference of a block duty of a selected block of a current frame and a block duty of the selected block of a previous frame, generating an original smoothing matrix for the selected block, generating a motion adaptive matrix according to the original smoothing matrix and a difference of the block duty of the selected block of the current frame and the block duty of the selected block of the previous frame, updating a block duty for each block with a corresponding motion adaptive matrix to generate an updated frame, and performing spatial smoothing for the updated frame.

13 Claims, 5 Drawing Sheets

FIG. 3

| $W_{15}$ 6 | $W_{25}$ 6 | $W_{35}$ 6 | $W_{45}$ 6 | $W_{55}$ 6 |
|---|---|---|---|---|
| $W_{14}$ 6 | $W_{24}$ 13 | $W_{34}$ 13 | $W_{44}$ 13 | $W_{54}$ 6 |
| $W_{13}$ 6 | $W_{23}$ 13 | $W_{33}$ 56 | $W_{43}$ 13 | $W_{53}$ 6 |
| $W_{12}$ 6 | $W_{22}$ 13 | $W_{32}$ 13 | $W_{42}$ 13 | $W_{52}$ 6 |
| $W_{11}$ 6 | $W_{21}$ 6 | $W_{31}$ 6 | $W_{41}$ 6 | $W_{51}$ 6 |

FIG. 4A

| $W'_{15}$ | $W'_{25}$ | $W'_{35}$ | $W'_{45}$ | $W'_{55}$ |
|---|---|---|---|---|
| $W'_{14}$ | $W'_{24}$ | $W'_{34}$ | $W'_{44}$ | $W'_{54}$ |
| $W'_{13}$ | $W'_{23}$ | $W'_{33}$ | $W'_{43}$ | $W'_{53}$ |
| $W'_{12}$ | $W'_{22}$ | $W'_{32}$ | $W'_{42}$ | $W'_{52}$ |
| $W'_{11}$ | $W'_{21}$ | $W'_{31}$ | $W'_{41}$ | $W'_{51}$ |

FIG. 4B

METHOD OF MOTION ADAPTIVE SPATIAL SMOOTHING FOR LOCAL DIMMING AND SYSTEM THEREOF

BACKGROUND OF THE INVENTION

1. Field of the Invention

The present invention is related to spatial smoothing, and more particularly to motion adaptive spatial smoothing.

2. Description of the Prior Art

Local dimming is a technology implemented in LED (Light-Emitting Diode) TVs to improve the contrast ratio by dimming the backlight in specific areas of the screen. This makes the dark parts of the image appear darker, while the bright parts of the image remain bright. The technique can improve the overall picture quality, especially in dark scenes.

However, local dimming can also introduce some drawbacks, including blooming, loss of detail in dark areas, and flickering. Blooming is a halo effect that can appear around bright objects in dark scenes. It is caused by the fact that the backlight cannot be dimmed perfectly, and some light leaks into the surrounding region. Loss of detail in dark areas can happen if the local dimming zones are too large. When a large area of the screen is dimmed, it can obscure details in the frame. Flickering can happen if the local dimming algorithm is not implemented properly. When the backlight flickers at a high frequency, it can be annoying to viewers.

SUMMARY OF THE INVENTION

An embodiment provides a method of motion adaptive spatial smoothing. The method includes determining a difference of a block duty of a selected block of a current frame and a block duty of the selected block of a previous frame, generating an original smoothing matrix for the selected block, generating a motion adaptive matrix according to the original smoothing matrix and a difference of the block duty of the selected block of the current frame and the block duty of the selected block of the previous frame, updating a block duty for each block with a corresponding motion adaptive matrix to generate an updated frame, and performing spatial smoothing for the updated frame.

An embodiment provides a motion adaptive spatial smoothing system including a block duty calculation module, a motion adaptive spatial smoothing module and a final block duty module. The block duty calculation module is used to generate block duties of a plurality of blocks of a current frame and a previous frame. The motion adaptive spatial smoothing module is used to determine a difference of a block duty of a selected block from the plurality of blocks of a current frame and a block duty of the selected block of a previous frame, generate an original smoothing matrix for the selected block, and generate a motion adaptive matrix according to the original smoothing matrix and a difference of the block duty of the selected block of the current frame and the block duty of the selected block of the previous frame. The final block duty module is used to update a block duty for each block with a corresponding motion adaptive matrix to generate an updated frame, and perform spatial smoothing for the updated frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates the difference of the block duties for the current frame and the previous frame.

FIG. 4A illustrates an original smoothing matrix of an embodiment.

FIG. 4B illustrates a motion adaptive matrix generated according to the original smoothing matrix in FIG. 4A.

DETAILED DESCRIPTION

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

In general, a backlight of a display can be divided into a number of blocks. Block duty in the context of this article is a term used in local dimming to describe the percentage of time that a block of the backlight is turned on. A block duty of 100% means that the block is always on, while a block duty of 0% means that the block is always off. Using a displayed frame as an example, the block duty of each block is determined by the brightness of the displayed frame in that region. For example, if a portion of the displayed frame within a block is very dark, the block duty of that block may be 0%. This means that the block will be turned off, which would improve the contrast ratio of the displayed frame. The block duty of a backlight block is an important factor in determining the contrast ratio of a display. A higher block duty would result in a better contrast ratio, but it would also consume more power.

Figure 1:
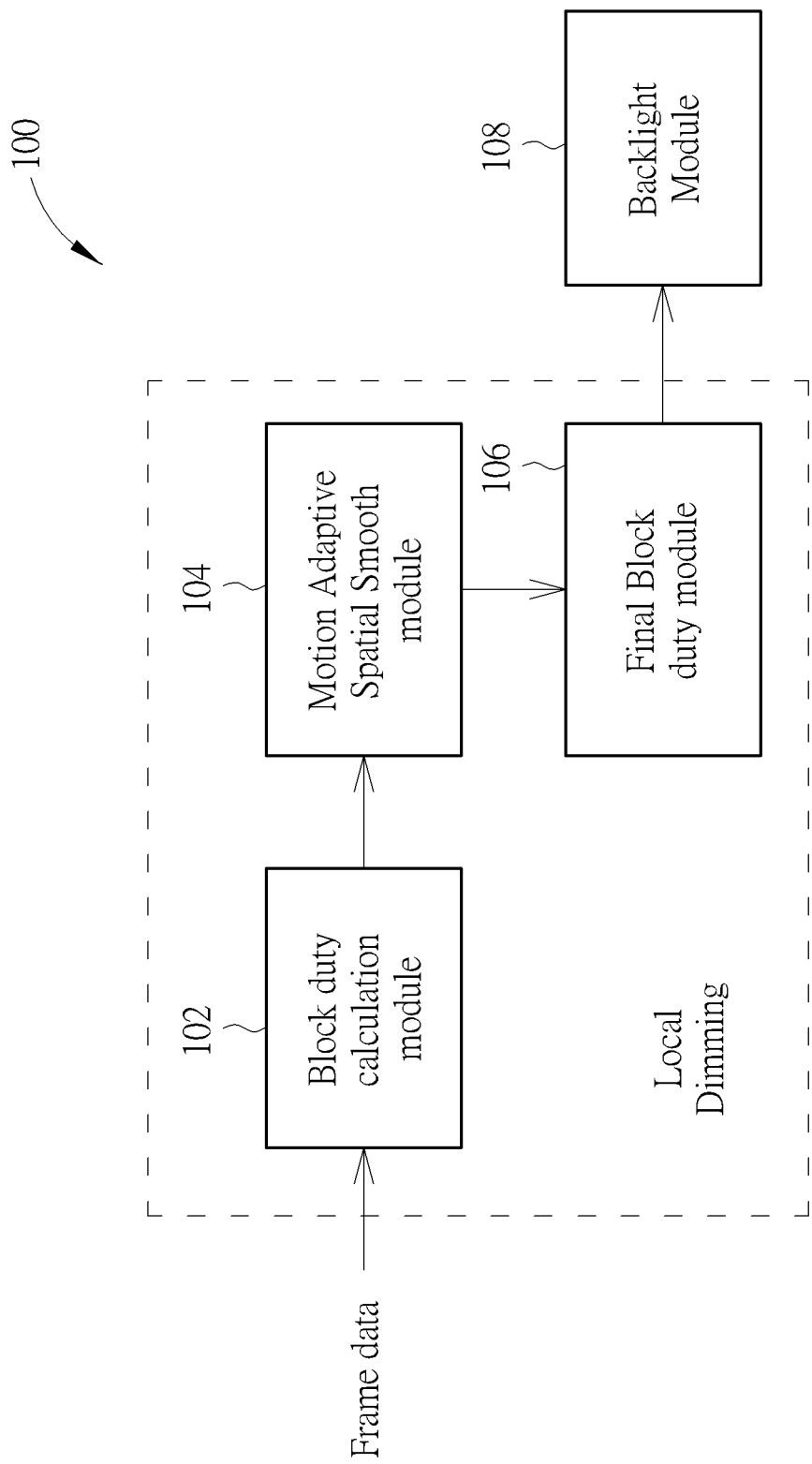
FIG. 1 illustrates a motion adaptive spatial smoothing system for local dimming of an embodiment.

FIG. 1 illustrates a motion adaptive spatial smoothing system 100 for local dimming of an embodiment. The motion adaptive spatial smoothing system 100 can be implemented in a display. The motion adaptive spatial smoothing system 100 includes a block duty calculation module 102, a motion adaptive spatial smoothing module 104, a final block duty module 106, and a backlight module 108. The block duty calculation module 102 can receive a frame sequence of a video in grayscale. A frame (more specifically, a backlight of the display) can be divided into a number of blocks (e.g., 200-1000 blocks). The block duty calculation module 102 would generate block duties of the blocks of a current frame and a previous frame from the frame sequence. Then, the motion adaptive spatial smoothing module 104 and final block duty module 106 would implement an algorithm to apply a motion adaptive spatial smoothing filter to the frame sequence so as to reduce visual halo and visual flickers when performing local dimming.

Figure 2:
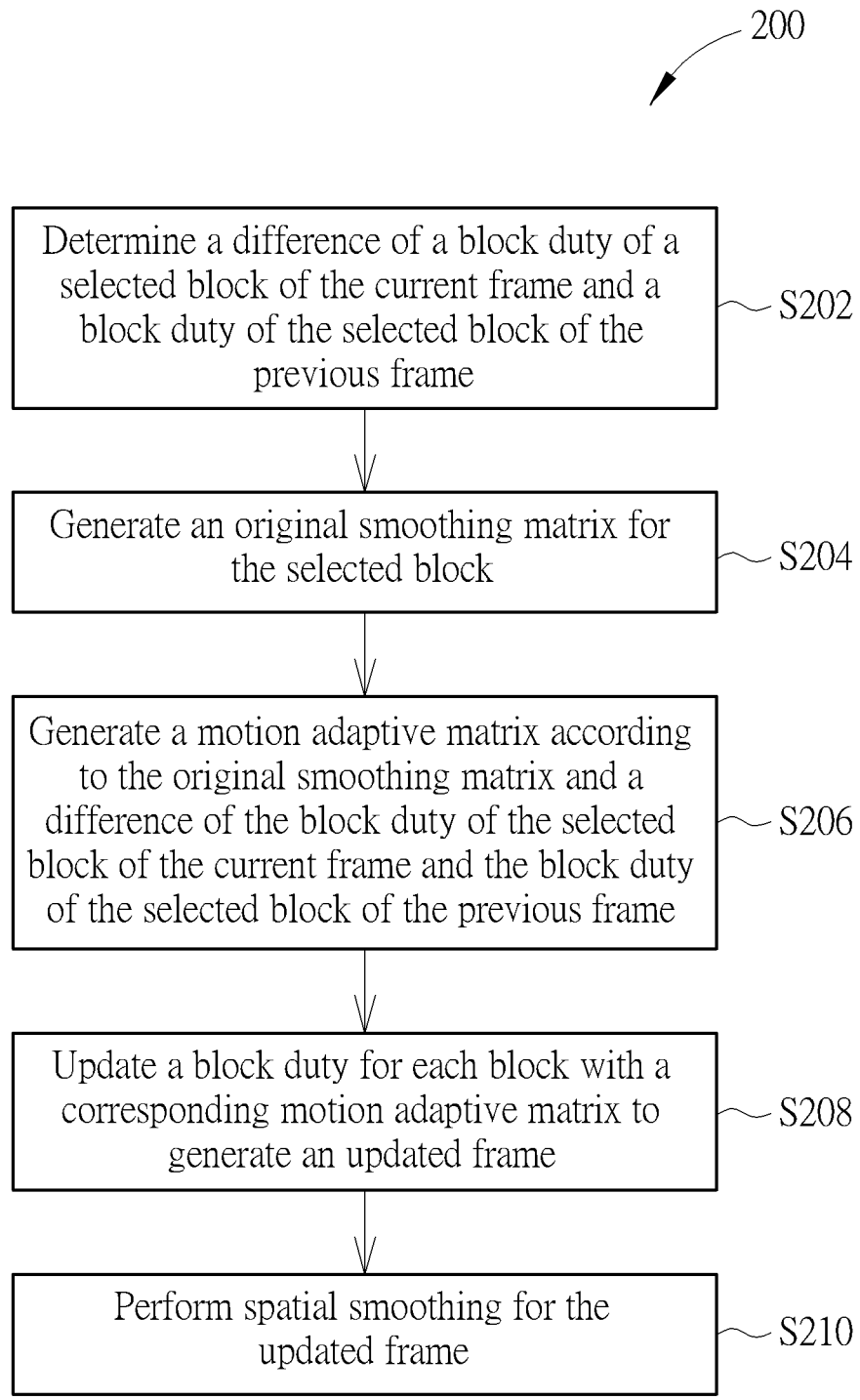
FIG. 2 illustrates a flowchart of a method implemented by the motion adaptive spatial smoothing module of FIG. 1.

FIG. 2 illustrates a flowchart of a method 200 implemented by the motion adaptive spatial smoothing module 104. The method 200 describes the algorithm for improve visual quality when performing local dimming. The method 200 includes the following steps:

S202: Determine a difference of a block duty of a selected block of the current frame and a block duty of the selected block of the previous frame;

S204: Generate an original smoothing matrix for the selected block;

S206: Generate a motion adaptive matrix according to the original smoothing matrix and a difference of the block duty of the selected block of the current frame and the block duty of the selected block of the previous frame;

S208: Update a block duty for each block with a corresponding motion adaptive matrix to generate an updated frame; and S210: Perform spatial smoothing for the updated frame.

In step S202, the difference of the block duties for a selected block can be determined by subtracting the block duty of the current frame from the block duty of the previous frame for the selected block. If the difference is non-zero, a motion occurs in a region including the selected block.

Figure 3:
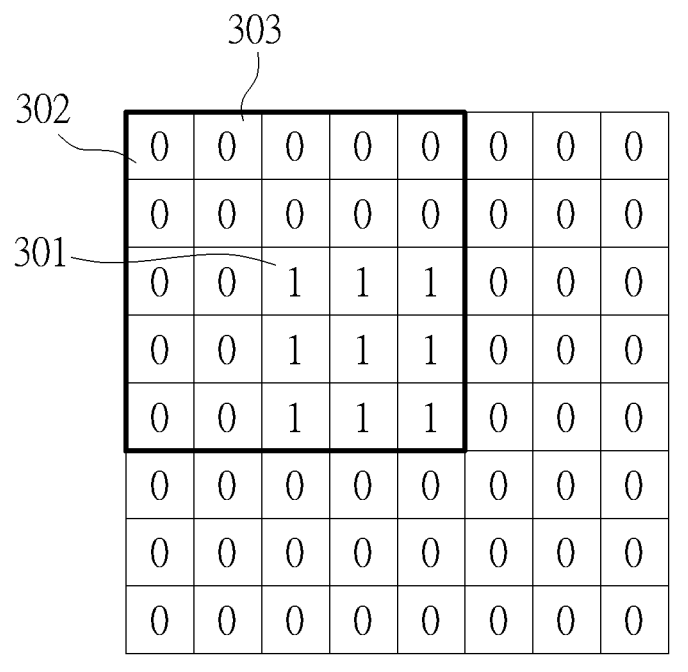

FIG. 3 illustrates the result of step S202, that is, the difference of the block duties for the current frame and the previous frame. The blocks with the number "1" can represent non-zero difference, and the blocks with the number "0" can represent zero difference.

In step S204, an original smoothing matrix can be generated for each block with non-zero difference. The original smoothing matrix may include M×M blocks with a selected non-zero difference block at a center, where M can be a positive odd number. Each block of the original smoothing matrix has a block duty. For example, taking the block 301 in FIG. 3 as the center, the original smoothing matrix may be a 5×5 matrix including the blocks within the box. This matrix includes the block 302 at the corner of the frame and the block 303 at the top of the frame. The size of the original smoothing matrix can be adjusted according to actual frame movement (e.g., 3×3, 7×7, etc.). The disclosure is not limited thereto.

FIG. 4A illustrates the 5×5 original smoothing matrix generated in step S204 of an embodiment. In this original smoothing matrix, the block 301 may correspond to the matrix element $W_{33}$, which represents the block duty of the block 301; the block 302 at the corner may correspond to the matrix element $W_{11}$, which represents the block duty of the block 302; the block 303 at the top may correspond to the matrix element Wiz, which represents the block duty of the block 303, and so on so forth. An example of the matrix elements of the original smoothing matrix is illustrated below (also in FIG. 4A):

| 6 | 6  | 6  | 6  | 6 |
|---|----|----|----|---|
| 6 | 13 | 13 | 13 | 6 |
| 6 | 13 | 56 | 13 | 6 |
| 6 | 13 | 13 | 13 | 6 |
| 6 | 6  | 6  | 6  | 6 |

In some embodiments which a block at the top left corner (e.g., block 302) corresponds to the matrix element $W_{33}$, the matrix elements do not have corresponding block duties (e.g., $W_{11}$-$W_{15}$, $W_{21}$-$W_{25}$, $W_{31}$, $W_{32}$, $W_{41}$, $W_{42}$, $W_{51}$, $W_{52}$), thus the missing block duties (e.g., $W_{11}$-$W_{15}$, $W_{21}$-$W_{25}$, $W_{31}$, $W_{32}$, $W_{41}$, $W_{42}$, $W_{51}$, $W_{52}$)) would be filled in with the block duty of the matrix element $W_{33}$ for calculation purpose. In some embodiments which a block at the top (e.g., block 303) corresponds to the matrix element $W_{33}$, the matrix elements do not have corresponding block duties (e.g., $W_{11}$-$W_{15}$, $W_{21}$-$W_{25}$) would be filled in with the block duty of the matrix element $W_{33}$ for calculation purpose. The above illustrations are merely examples and the invention is limited thereto.

Then in step S206, a motion adaptive matrix can be generated according to the original smoothing matrix of FIG. 4A. FIG. 4B illustrates the 5×5 motion adaptive matrix generated in step S206.

The motion adaptive matrix can be generated according to a following formula:

$$W'_{ij} = W_{ij} \times \frac{\text{BD\_diff}(Wc)}{\text{Max\_duty}}$$

$W_{ij}$ is a matrix element in row i and column j of the original smoothing matrix. $W'_{ij}$ is a matrix element in row i and column j of the motion adaptive matrix. Wc is a matrix element at the center of the original smoothing matrix, which is the matrix element $W_{33}$ in this case. BD_diff(Wc) is the difference of the block duty of the selected block of the current frame and the block duty of the selected block of the previous frame. Max_duty is a maximum block duty (i.e., 255). It should be noted that $W'_{33}=W_{33}$ for calculation purpose. The calculation described herein can be performed by the motion adaptive spatial smoothing module 104.

Thus, the motion adaptive matrix can be obtained by the following calculation:

$$W'_{11} = W_{11} \times \text{BD\_diff}(W_{33})/\text{Max\_duty}$$

$$W'_{12} = W_{12} \times \text{BD\_diff}(W_{33})/\text{Max\_duty}$$

$$W'_{13} = W_{13} \times \text{BD\_diff}(W_{33})/\text{Max\_duty}$$

$$\vdots$$

$$W'_{55} = W_{55} \times \text{BD\_diff}(W_{33})/\text{Max\_duty}$$

After the motion adaptive matrix in FIG. 4B is obtained through the above calculation, in step S208 the block duty for the block 301 can be updated according to the motion adaptive matrix. The updated block duty can be obtained with the following formula:

$$\text{Updated\_BD} = \frac{\sum_{i=1}^{M}\sum_{j=1}^{M} W_{ij} \times W'_{ij}}{\sum_{i=1}^{M}\sum_{j=1}^{M} W'_{ij}}$$

Updated_BD is an updated block duty for the selected block (e.g., the block 301). The calculation described herein can be performed by the final block duty module 106.

Thus, the updated block duty can be obtained by the following calculation:

$$\text{Updated\_BD} = (W_{11} \times W'_{11} + W_{12} \times W'_{12} + \ldots W_{55} \times W'_{55})/(W'_{11} + W'_{12} + \ldots W'_{55})$$

After all block duties of blocks with non-zero difference are updated through the above-described process, in step S210, spatial smoothing filters can be generated according to the updated block duties and be applied to all the blocks of the updated frame. The result is then sent to the backlight module 108 for improved block duty lighting control.

Figure 5:
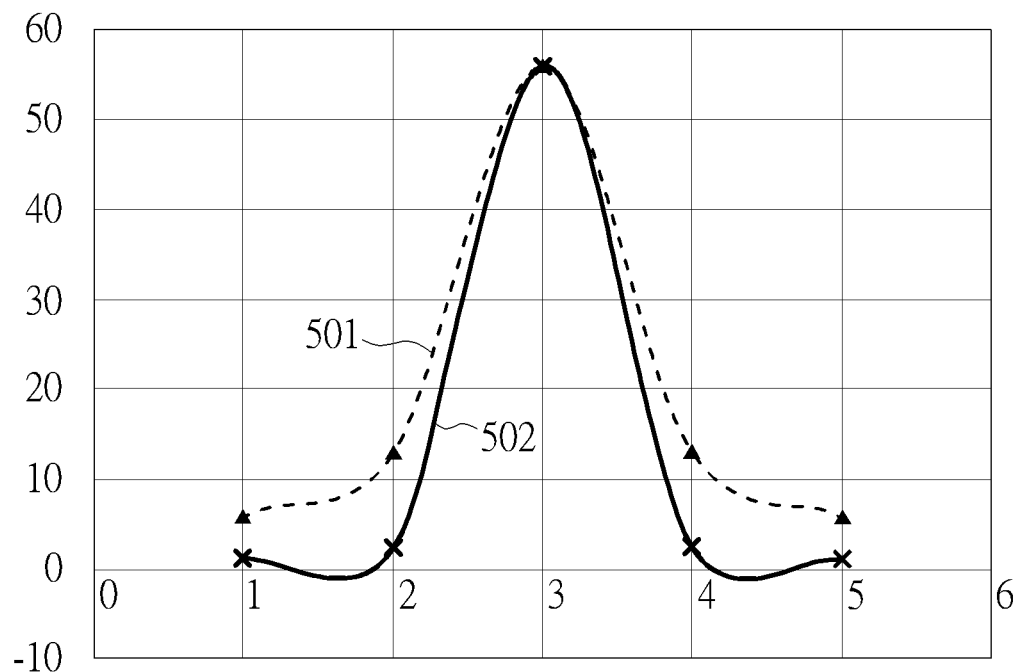
FIG. 5 illustrates spatial smoothing filters of an embodiment.

FIG. 5 illustrates spatial smoothing filters of an embodiment. The curve 501 is one-dimensional profile of a spatial smoothing filter without implementing the method 200. In contrast, the curve 502 is a one-dimensional profile of a spatial smoothing filter with implementation of the method 200. The horizontal axis represents the block number, and the vertical axis represents the block duty. As shown in FIG. 5, the curve 502 is more concentrated at the center than the curve 501. As such, the curve 502 can represent a better optimized spatial smoothing filter for situation where less motion occurring from the previous frame to the current frame.

Figure 6:
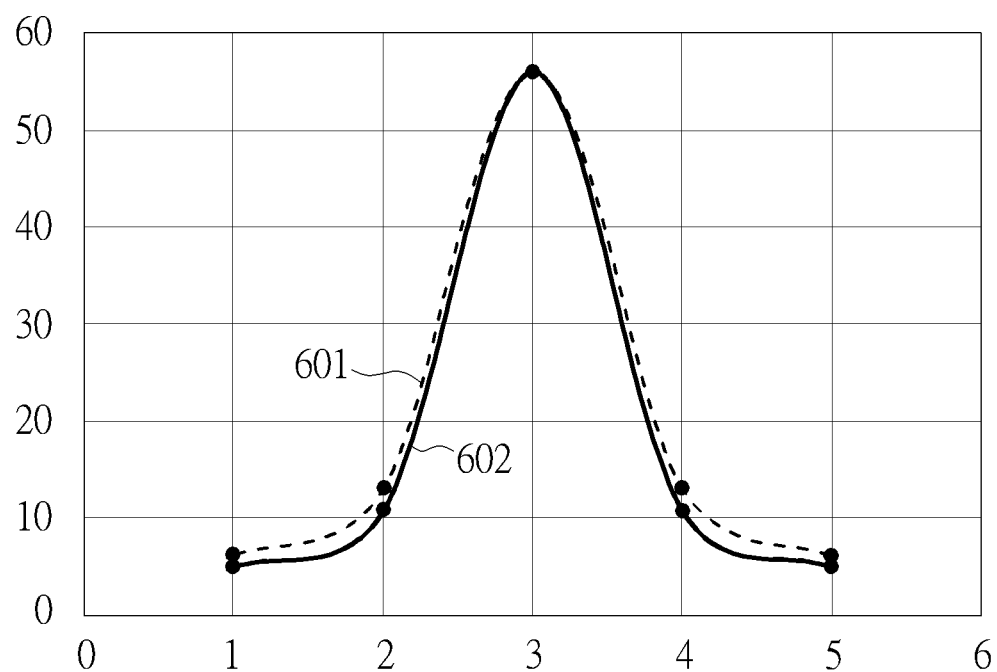
FIG. 6 illustrates spatial smoothing filters of another embodiment.

FIG. 6 illustrates spatial smoothing filters of an embodiment. The curve 601 is one-dimensional profile of a spatial smoothing filter without implementing the method 200. In contrast, the curve 602 is a one-dimensional profile of a spatial smoothing filter with implementation of the method 200. The horizontal axis represents the block number, and the vertical axis represents the block duty. As shown in FIG. 6, the curve 602 has a similar shape to the curve 601. The curve 602 can represent a better optimized spatial smoothing filter for situation where more motion occurring from the previous frame to the current frame.

The embodiments described above illustrate a method and system of implementing spatial smoothing filters adaptively by implementing motion adaptive matrices. Thus, it can effectively reduce leaking light, loss of details, halos and flickers which are annoying to the viewers.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences.

Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of motion adaptive spatial smoothing comprising:
   determining a difference of a block duty of a selected block of a current frame and a block duty of the selected block of a previous frame;
   generating an original smoothing matrix for the selected block;
   generating a motion adaptive matrix according to the original smoothing matrix and a difference of the block duty of the selected block of the current frame and the block duty of the selected block of the previous frame;

updating a block duty for each block with a corresponding motion adaptive matrix to generate an updated frame; and performing spatial smoothing for the updated frame.

2. The method of claim 1, wherein both the original smoothing matrix and the motion adaptive matrix are M×M matrices.

3. The method of claim 2, wherein M is a positive odd number.

4. The method of claim 3, wherein the original smoothing matrix comprises block duties of M×M blocks with the selected block at a center of the original smoothing matrix.

5. The method of claim 4, wherein the motion adaptive matrix is generated according to a following formula:

$$W'_{ij} = W_{ij} \times \frac{\text{BD\_diff}(Wc)}{\text{Max\_duty}}$$

wherein:
  $W_{ij}$ is a matrix element in row i and column j of the original smoothing matrix;
  $W'_{ij}$ is a matrix element in row i and column j of the motion adaptive matrix;
  Wc is a matrix element at the center of the original smoothing matrix;
  BD_diff(Wc) is the difference of the block duty of the selected block of the current frame and the block duty of the selected block of the previous frame; and
  Max_duty is a maximum block duty.

6. The method of claim 5, wherein the updating the block duty for each block is according to a following formula:

$$\text{Updated\_BD} = \frac{\sum_{i=1}^{M}\sum_{j=1}^{M} W_{ij} \times W'_{ij}}{\sum_{i=1}^{M}\sum_{j=1}^{M} W'_{ij}}$$

wherein Updated_BD is an updated block duty for the selected block.

7. A motion adaptive spatial smoothing system comprising:
  a block duty calculation module configured to generate block duties of a plurality of blocks of a current frame and a previous frame; and
  a motion adaptive spatial smoothing module configured to:
    determine a difference of a block duty of a selected block from the plurality of blocks of a current frame and a block duty of the selected block of a previous frame;
    generate an original smoothing matrix for the selected block; and
    generate a motion adaptive matrix according to the original smoothing matrix and a difference of the block duty of the selected block of the current frame and the block duty of the selected block of the previous frame; and
  a final block duty module configured to:
    update a block duty for each block with a corresponding motion adaptive matrix to generate an updated frame; and
    perform spatial smoothing for the updated frame.

8. The motion adaptive spatial smoothing system of claim 7, wherein both the original smoothing matrix and the motion adaptive matrix are M×M matrices.

9. The motion adaptive spatial smoothing system of claim 8, wherein M is a positive odd number.

10. The motion adaptive spatial smoothing system of claim 9, wherein the original smoothing matrix comprises block duties of M×M blocks with the selected block at a center of the original smoothing matrix.

11. The motion adaptive spatial smoothing system of claim 10, wherein the motion adaptive matrix is generated according to a following formula:

$$W'_{ij} = W_{ij} \times \frac{\text{BD\_diff}(Wc)}{\text{Max\_duty}}$$

wherein:
  $W_{ij}$ is a matrix element in row i and column j of the original smoothing matrix;
  $W'_{ij}$ is a matrix element in row i and column j of the motion adaptive matrix;
  Wc is a matrix element at the center of the original smoothing matrix;
  BD_diff(Wc) is the difference of the block duty of the selected block of the current frame and the block duty of the selected block of the previous frame; and
  Max_duty is a maximum block duty.

12. The motion adaptive spatial smoothing system of claim 11, wherein the updating the block duty for each block is according to a following formula:

$$\text{Updated\_BD} = \frac{\sum_{i=1}^{M}\sum_{j=1}^{M} W_{ij} \times W'_{ij}}{\sum_{i=1}^{M}\sum_{j=1}^{M} W'_{ij}}$$

wherein Updated_BD is an updated block duty for the selected block.

13. The motion adaptive spatial smoothing system of claim 8 further comprising a backlight module configured to perform lighting control according to the updated frame.

* * * * *